(12) United States Patent
Maeda et al.

(10) Patent No.: US 7,147,940 B2
(45) Date of Patent: Dec. 12, 2006

(54) PERPENDICULAR MAGNETIC RECORDING MEDIUM

(75) Inventors: Maki Maeda, Kawasaki (JP); Hiroto Takeshita, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/346,342

(22) Filed: Jan. 17, 2003

(65) Prior Publication Data
US 2003/0228499 A1 Dec. 11, 2003

(30) Foreign Application Priority Data
Jun. 6, 2002 (JP) ............... 2002-165820

(51) Int. Cl.
G11B 5/66 (2006.01)
G11B 5/70 (2006.01)

(52) U.S. Cl. .................................... 428/827

(58) Field of Classification Search ........ 428/694 TM, 428/694 TS, 216, 900
See application file for complete search history.

(56) References Cited
U.S. PATENT DOCUMENTS 6,602,620 B1 * 8/2003 Kikitsu et al. .......... 428/694 T
6,602,621 B1 * 8/2003 Matsunuma et al. ... 428/694 TS
6,620,532 B1 * 9/2003 Aoyama ................ 428/694 TR

FOREIGN PATENT DOCUMENTS

JP 2000-251236 9/2000

OTHER PUBLICATIONS

"Monodisperse FePt Nanoparticles and Ferromagnetic FePt Nanocrystal Superlattices"; Science vol. 287, pp. 1989-1992; Mar. 17, 2000.
"Self-Assembling Magnetic Nanomaterials"; J. Mag. Soc. Japan; pp. 1434-1440; 2001.

* cited by examiner

Primary Examiner—Holly Rickman
(74) Attorney, Agent, or Firm—Greer, Burns & Crain, Ltd.

(57) ABSTRACT

The present invention provides a perpendicular magnetic recording medium that reduces medium noise and achieves thermal stability of recording magnetization. This perpendicular magnetic recording medium has a substrate and a recording layer formed by single-layered magnetic nanoparticles that are aligned at uniform intervals. An auxiliary magnetic film that is thinner than the recording layer is interposed between the substrate and the recording layer. The magnetization of the magnetic nanoparticles is secured by the exchange interaction effect of the auxiliary magnetic film.

16 Claims, 6 Drawing Sheets

FIG.7

| | FILM THICKNESS t (nm) | tBr (μt·μm) | A2 (J/m) | Hc//2 (kA/m) | Hc⊥2 (kA/m) | Hc//2/Hc⊥2 | RESIDUAL MAGNETIZATION STATE | THERMAL STABILITY |
|---|---|---|---|---|---|---|---|---|
| EXAMPLE 1 | 1 | 750 | $4 \times 10^{-12}$ | 27.7 | 860 | 3% | ◎ | ◎ |
| EXAMPLE 2 | 1 | 750 | $2 \times 10^{-12}$ | 126 | 521 | 25% | ◎ | ◎ |
| EXAMPLE 3 | 1 | 750 | $4 \times 10^{-12}$ | 126 | 521 | 25% | ○ | ◎ |
| COMPARATIVE EXAMPLE 1 | 1 | 750 | $5 \times 10^{-12}$ | 126 | 521 | 25% | × | NOT MEASURABLE |
| COMPARATIVE EXAMPLE 2 | 0 | | | | | | ◎ | × |

◎:EXCELLENT, ○:GOOD, ×:POOR

PERPENDICULAR MAGNETIC RECORDING MEDIUM

BACKGROUND OF THE INVENTION

The present invention generally relates to perpendicular magnetic recording media, and, more particularly, to a perpendicular magnetic recording medium that can achieve a high recording density.

Conventionally, in-plane magnetic recording media have reduced media noise and secured the S/N in reproduction signals, so as to achieve higher recording densities to compensate decreases in output voltage due to high-density recording. In recent years, perpendicular magnetic recording media have become popular in pursuit of even higher recording densities.

FIG. 1 illustrates a conventional perpendicular magnetic recording medium 10. As shown in FIG. 1, the perpendicular magnetic recording medium 10 has a substrate 11. On the substrate 11, the perpendicular magnetic recording medium 10 has a soft-magnetic backing layer 12, a non-magnetic intermediate layer 13, a recording layer 15, and a protection layer 16 stacked in this order. The recording layer 15 is a magnetic film of a CoCr-based alloy formed by a sputtering method. Such a magnetic film is made up of the boundary of crystal grains of a high Cr concentration and crystal grains that are the cores of the crystal grains of a high Cr concentration, with Cr atoms segregating on the boundary surfaces of the crystal grains. Among these crystal grains, there are magnetostatic interactive effects and exchange interaction effects. The grain size of each of the crystal grains is large. If the distance between each two crystal grains is long, those interaction effects become greater, resulting in an increase of medium noise. To solve this problem, the materials and film-forming conditions for recording layers and underlayers have been optimized, so that the grain sizes can be reduced and made uniform.

However, recording layers of CoCr-based alloys formed by a sputtering method cannot satisfy today's demand for recording densities higher than 775 Mbits/cm$^2$ (500 Gbits/inch$^2$), because the grain sizes cannot be reduced and made uniform sufficiently. As a result, a sufficient reduction of medium noise cannot be achieved.

As a solution for achieving minute and uniform ferromagnetic crystal grains, a variety of chemical techniques have been suggested. These techniques are disclosed in publications such as Science (Vol. 287, No. 17 (2000), pages 1989–1992, Sun, et. al) and J. Mag. Soc. Japan (Vol. 25, No. 8 (2001), pages 1434–1440).

In accordance with the inventions disclosed in those publications, the spherical magnetic nanoparticles have grain sizes of nanometers. FIG. 2 is a sectional view of a magnetic recording medium 20 having stacked spherical magnetic nanoparticles. As shown in FIG. 2, a recording layer 25 and a protection layer 26 are stacked on a substrate in this order. The recording layer 25 has a thickness of 20 nm to 100 nm, and is formed by stacking spherical magnetic nanoparticles.

Although the recording layer 25 shown in FIG. 2 is formed by uniform magnetic nanoparticles 27, the positions of the magnetic nanoparticles 27 are shifted on each layer in the film thickness direction if the magnetic nanoparticles 27 have a meticulous filling structure. As a result, the magnetic transition regions are disturbed at the time of recording. Because of this, the recording layer 25 cannot achieve a sufficient reduction of medium noise.

To reduce medium noise, a perpendicular magnetic recording medium 30 having conventional spherical magnetic nanoparticles in the form of a single layer has been suggested. As shown in FIG. 3, the perpendicular magnetic recording medium 30 has a substrate 31. On the substrate 31, the perpendicular magnetic recording medium 30 has a soft-magnetic backing layer 32, a non-magnetic intermediate layer 33, a recording layer 35, and a protection layer 36 stacked in this order. The recording layer 35 is formed by spherical magnetic nanoparticles 37 that are aligned at uniform intervals and formed into a single layer. In this structure, the unevenness of the magnetic nanoparticles in the film thickness direction is eliminated, and the exchange interaction effect can be reduced. Accordingly, this perpendicular magnetic recording medium 30 can reduce the medium noise and achieves a higher recording density.

With the recoding layer 35 of the perpendicular magnetic recording medium 30, however, there is a problem of thermal instability. More specifically, since the exchange interaction effect is restrained, the residual magnetization rapidly decreases after a recording operation. It is a known fact that, to achieve thermal stability of residual magnetization, the index expressed as KuV/kT should be great. Here, Ku represents the anisotropic energy, V represents the effective grain volume (equivalent to the total volume of the magnetic nanoparticles coupled by the exchange interaction effect), k represents the Boltzmann constant, and T represents the absolute temperature. Since the recording layer 35 of the perpendicular magnetic recording medium 30 has a small exchange interaction effect, the effective grain volume V becomes equal to the volume of each one of the magnetic nanoparticles 37. As the volume V becomes smaller, the index KuV/kT also becomes smaller, resulting in thermal instability. Judging from these facts, the perpendicular magnetic recording medium 30 cannot achieve a sufficient reduction of medium noise and greater thermal stability at the same time.

SUMMARY OF THE INVENTION

A general object of the present invention is to provide perpendicular magnetic recording media in which the above disadvantages are eliminated.

A more specific object of the present invention is to provide a perpendicular magnetic recording medium that has smaller medium noise and greater thermal stability of recording magnetization.

The above objects of the present invention are achieved by a perpendicular magnetic recording medium having a recording layer over a substrate. This perpendicular magnetic recording medium includes the recording layer that is a single layer formed by aligning magnetic nanoparticles of uniform particle sizes at uniform intervals, and an auxiliary magnetic film that is located between the recording layer and the substrate at such a position that has an exchange interaction effect on the magnetic nanoparticles.

In this perpendicular magnetic recording medium, the magnetic nanoparticles of uniform particle sizes are aligned at uniform intervals and formed into a single layer. Because of this, the exchange interaction effect and the magnetostatic interaction effect among the magnetic nanoparticles in the film are restrained, and medium noise can be reduced. At the same time, the auxiliary magnetic film that is magnetized during a recording operation has an exchange interaction effect on the magnetic nanoparticles of the recording layer, and secures the magnetization of the magnetic nanoparticles.

Thus, the thermal stability of the magnetization of the recording layer can be improved.

The above objects of the present invention are also achieved by a magnetic recording device that employs the above perpendicular magnetic recording medium.

The above and other objects and features of the present invention will become more apparent from the following description taken in conjunction with the accompanying drawings.

BRIEF DESCRIPTION OF THE DRAWINGS

FIG. 7 shows the parameters employed in Examples and Comparative Examples, and the results of a computer simulation;

DESCRIPTION OF THE PREFERRED EMBODIMENTS

The following is a description of embodiments of the present invention, with reference to the accompanying drawings.

Figure 1:
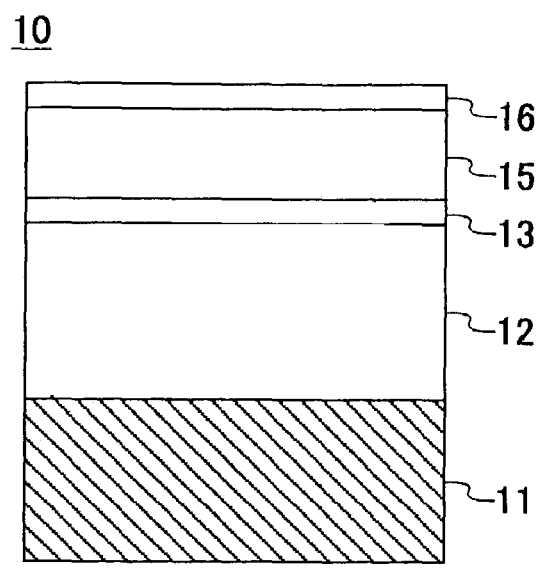
FIG. 1 is a sectional view of a conventional perpendicular magnetic recording medium.
Figure 2:
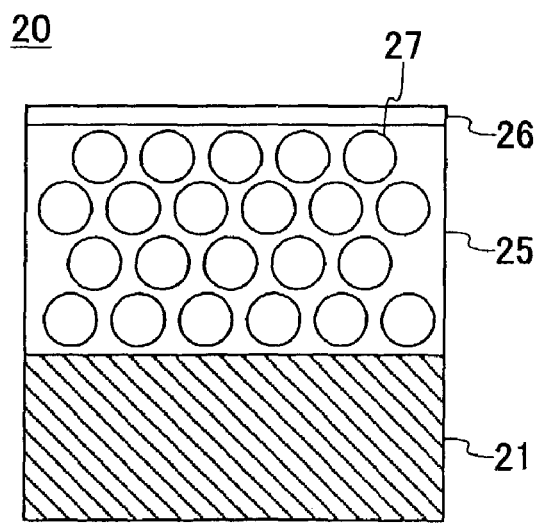
FIG. 2 is a sectional view of a magnetic recording medium having a recording layer formed by conventional stacked magnetic nanoparticles.
Figure 3:
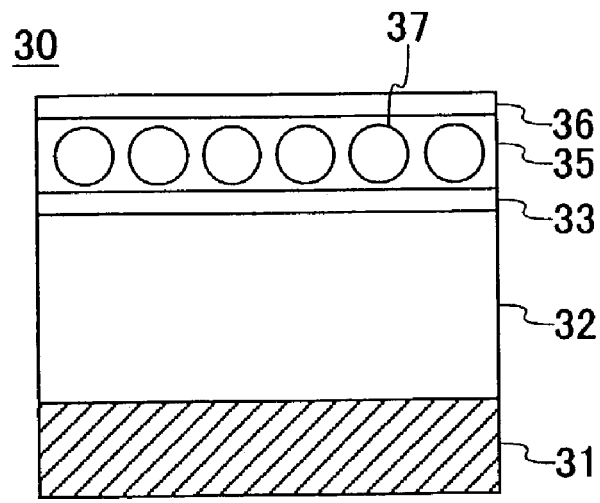
FIG. 3 is a sectional view of a perpendicular magnetic recording medium having a recording layer formed by single-layered magnetic nanoparticles.
Figure 4:
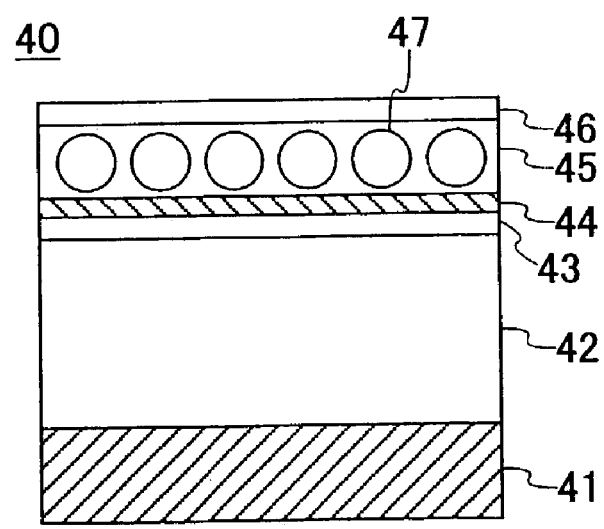
FIG. 4 is a sectional view of a perpendicular magnetic recording medium in accordance with the present invention.

FIG. 4 is a sectional view of a perpendicular magnetic recording medium in accordance with the present invention. As shown in FIG. 4, a perpendicular magnetic recording medium 40 has a substrate 41. In this perpendicular magnetic recording medium, a soft-magnetic backing layer 42, a non-magnetic intermediate layer 43, an auxiliary magnetic film 44, a recording layer 45 made of magnetic nanoparticles 47, and a protection layer 46, are stacked on the substrate 41 in this order.

The substrate 41 is a conventional substrate for magnetic disks, such as a crystallized glass substrate, a tempered glass substrate, an aluminum-magnesium alloy substrate, or a Si wafer.

The soft-magnetic backing layer 42 has a thickness of 100 nm to 2 μm, and is formed by a soft-magnetic material having a high saturation magnetic flux density Bs, such as permalloy (NiFe), NiFeNb, or CoCrNb. This soft-magnetic backing layer 42 is manufactured by a plating method, a sputtering method, a vapor deposition method, or a CVD method.

The employment of the soft-magnetic backing layer 42 depends on the types of recording heads, such as single-pole magnetic heads and ring-shaped heads. If recording is to be performed with a ring-shaped head, the soft-magnetic backing layer 42 is not necessary.

The non-magnetic intermediate layer 43 has a thickness of 1 nm to 50 nm, and is formed by a non-magnetic material such as Ti, C, Pt, TiCr, CoCr, $SiO_2$, MgO, or $Al_2O_3$. Alternatively, the non-magnetic intermediate layer 43 may be formed by a laminated layer including one or more of those alloys. The non-magnetic intermediate layer 43 is manufactured by a sputtering method, a vapor deposition method, or a CVD method. The non-magnetic intermediate layer 43 controls the crystallinity, the grain size, and the perpendicular orientation of the auxiliary magnetic film 44 placed on the non-magnetic intermediate layer 43.

The auxiliary magnetic film 44 is made of an alloy such as FePt, FePd, CoPt, or CoPd, or an artificial lattice film that is formed by repeatedly laminating Pt(0.5 nm in thickness)/Co(0.3 nm in thickness) or Pd(0.5 nm in thickness)/Co(0.3 nm in thickness).

The auxiliary magnetic film 44 preferably has an exchange stiffness constant that is greater than $1 \times 10^{-12}$ J/M and smaller than $5 \times 10^{-12}$ J/m. The auxiliary magnetic film 44 that is magnetized by a magnetic field generated from a recording head has an exchange interaction. effect on the magnetization of the magnetic nanoparticles 47 of the recording layer 45, and secures the magnetization of the magnetic nanoparticles 47. The degree of the exchange interaction effect can be expressed by an exchange stiffness constant. The exchange stiffness constant is an essential factor in determining the exchange interaction between the auxiliary magnetic film 44 and the magnetic nanoparticles 47 of the recording layer 45. The auxiliary magnetic film 44 and the magnetic nanoparticles 47 are magnetized by a recording magnetic field generated from a recording head. After the recording magnetic field is removed, the magnetization of the auxiliary magnetic film 44 has an exchange interactive effect on the magnetization of the magnetic nanoparticles 47. The degree of the exchange interactive effect is determined by the respective exchange stiffness constants and the distance between the auxiliary magnetic film 44 and the recording layer 45. Thus, the magnetization of the magnetic nanoparticles 47 is prevented from decreasing due to thermal instability.

If the exchange stiffness constant of the auxiliary magnetic film 44 is $1 \times 10^{-12}$ J/m or smaller, the exchange interaction effect on the magnetization of the magnetic nanoparticles 47 of the recording layer 45 is not sufficient. As a result, the orientations of the magnetic nanoparticles 47 become random immediately after recording. More specifically, some of the magnetic nanoparticles 47 randomly face upward while the others face downward perpendicularly to the film surface. In this state, desired information recording cannot be performed. On the other hand, if the exchange stiffness constant of the auxiliary magnetic film 44 is $5 \times 10^{-12}$ J/m or greater, the auxiliary magnetic film 44 cannot be magnetized by a normal recording magnetic field.

Further, the exchange stiffness constant of the auxiliary magnetic film 44 should preferably be equal to or greater than the exchange stiffness constant of the magnetic nanoparticles 47. If this condition is satisfied, the exchange interaction among the magnetic nanoparticles 47 is restricted, the medium noise is reduced, and the exchange interaction effect of the auxiliary magnetic film 44 is sufficient for magnetizing the magnetic nanoparticles 47. Thus, the thermal stability of the magnetization of the magnetic nanoparticles 47 can be improved. Meanwhile, the exchange stiffness constants are measured by a Brillouin scattering method.

The auxiliary magnetic film 44 has a magnetic easy axis extending perpendicularly to the film surface. This perpendicular orientation is expressed by the ratio of the coercive force $H_{c//2}$ of the longitudinal direction of the auxiliary magnetic film 44 to the coercive force $H_{c\perp 2}$ of the perpendicular direction of the auxiliary magnetic film 44, i.e., $H_{c//2}/H_{c\perp 2}$. If this ratio is small, the magnetic easy axis extends in the perpendicular direction. The ratio $H_{c//2}/H_{c\perp 2}$ should preferably be 25% or lower, more preferably, 10% or lower, so that the width of the magnetic transition region of the recording layer 45 can be narrowed. If the ratio $H_{c//2}/H_{c\perp 2}$ exceeds 25%, the magnetic transition region of the recording layer 45 becomes too wide to carry out high-density recording.

The perpendicular orientation of the auxiliary magnetic film 44 can be controlled by conditions such as the material of the non-magnetic intermediate layer 43 located below the auxiliary magnetic film 44, the film-forming conditions for forming the auxiliary magnetic film 44, and the field thermal treatment conducted after the formation of the auxiliary magnetic film 44. In the present invention, the magnetic nanoparticles 47 are subjected to a thermal treatment after the formation of the protection layer 46, so that the perpendicular orientation is controlled.

The product tBr of the thickness and the residual magnetic flux density of the auxiliary magnetic film 44 should preferably be 30% of the product tBr of the recording layer 45 or smaller. In the structure of the perpendicular magnetic recording medium 40 of the present invention, the magnetic field generated from the magnetic nanoparticles 47 of the recording layer 45 is overlapped with the magnetic field generated from the auxiliary magnetic film 44, and the overlapped magnetic fields are converted into an output voltage by an MR head (magnetoresistive head). If the product tBr of the auxiliary magnetic film 44 is greater than 30% of the product tBr of the recording layer 45, the auxiliary magnetic film 44 deforms the reproduced waveform and increases medium noise.

The recording layer 45 is made up of the spherical magnetic nanoparticles 47 that align themselves at uniform intervals, and amorphous carbon that secures the alignment. The recording layer 45 has a thickness of 3 nm to 50 nm. The magnetic nanoparticles 47 are made of a regular alloy such as FePt, FePd, CoPt, or CoPd.

This recording layer 45 can be formed by any of the methods disclosed in the publications mentioned earlier. For example, according to a polyol reducing method, an organometallic precursor solution containing Fe and Pt is reduced and decomposed, so as to produce the magnetic nanoparticles 47 covered with a stabilizer of oleic acid or oleyl amine. A refinement process for the magnetic nanoparticles 47 is then carried out a few times with a centrifugal separator, and the concentration of the magnetic nanoparticles 47 is adjusted. The resultant magnetic nanoparticles 47 are applied onto the auxiliary magnetic film 44 by a dipping method or a spin coating method. A thermal treatment is then conducted. In the present invention, a magnetic field of 2T is applied in the perpendicular direction to the film surface, and the thermal treatment is conducted in an Ar gas atmosphere of $3\times10^4$ Pa at 480° C. for 30 minutes. By this thermal treatment, the crystalline lattice of the magnetic nanoparticles 47 of FePt is regulated, and the anisotropic energy and the coercive force in the perpendicular direction to the film surface are increased. Thus, the magnetic easy axis of the magnetic nanoparticles 47 can extend perpendicularly to the film surface.

The protection layer 46 has a thickness of 0.5 nm to 15 nm, and is made of a material such as carbon, hydrogenated carbon, or carbon nitride. The protection layer 46 is formed by a sputtering method or a CVD method. Further, a lubricant layer (not shown) having a thickness of 0.5 nm to 5 nm is formed on the protection layer 46.

EXAMPLE 1

In this example, the perpendicular magnetic recording medium 40 had a laminated structure. More specifically, the perpendicular magnetic recording medium 40 had the substrate 41 made of crystallized glass. On this substrate 41, the perpendicular magnetic recording medium 40 had: the soft-magnetic backing layer 42 that was made of CoCrNb and had a thickness of 300 nm; the non-magnetic intermediate layer 43 that was made of $Al_2O_3$ and had a thickness of 10 nm; the auxiliary magnetic film 44; the recording layer 45; the protection layer 46 that was made of hydrogenated carbon and had a thickness of 5 nm; and a lubricant layer that was made of Z-DOL (TM) and had a thickness of 1.0 nm.

The magnetic nanoparticles 47 of the recording layer 45 were made of FePt. The particle size (the diameter) of the magnetic nanoparticles 47 was 3.38 nm, and each gap among the magnetic nanoparticles 47 in the longitudinal direction was 1 nm. The recording layer 45 had a thickness of 4.38 nm, a product tBr of 2530 µT·µm (25.3 Gµ·m), and a magnetocrystalline anisotropy field $H_{k1}$ of $1.6\times10^6$ A/m (20 kOe). Also, the coercive force $H_{c//1}$ was 27.7 kA/m, the coercive force $H_{c\perp 1}$ was 860 kA/m, and the ratio $H_{c//1}/H_{c\perp 1}$ was 3%. The exchange stiffness constant $A_1$ of the magnetic nanoparticles 47 was $2\times10^{-12}$ J/m.

The auxiliary magnetic film 44 was made of CoPt and had a film thickness of 1 nm. The product tBr was 750 µT·µm, the exchange stiffness constant $A_2$ was $4\times10^{-12}$ J/m, the coercive force $H_{c//2}$ was 27.7 kA/m, the coercive force $H_{c\perp 2}$ was 860 kA/m, the ratio $H_{c//2}/H_{c\perp 2}$ was 3%, and the magnetocrystalline anisotropy field $H_{k2}$ was 1600 kA/m.

EXAMPLE 2

This example had the same structure as Example 1, except for the auxiliary magnetic film.

The auxiliary magnetic film 44 was made of CoPt and had a film thickness of 1 nm. The product tBr was 750 µT·µm, the exchange stiffness constant $A_2$ was $2\times10^{-12}$ J/m, the coercive force $H_{c//2}$ was 126 kA/m, the coercive force $H_{c\perp 2}$ was 521 kA/m, the ratio $H_{c//2}/H_{c\perp 2}$ was 25%, and the magnetocrystalline anisotropy field $H_{k2}$ was 1600 kA/m.

EXAMPLE 3

This example had the same structure as Example 1, except for the auxiliary magnetic film.

The auxiliary magnetic film 44 was made of CoPt and had a film thickness of 1 nm. The product tBr was 750 µT·µm, the exchange stiffness constant $A_2$ was $4\times10^{-12}$ J/m, the coercive force $H_{c//2}$ was 126 kA/m, the coercive force $H_{c\perp 2}$ was 521 kA/m, the ratio $H_{c//2}/H_{c\perp 2}$ was 25%, and the magnetocrystalline anisotropy field $H_{k2}$ was 1600 kA/m.

COMPARATIVE EXAMPLE 1

As a comparative example, a perpendicular magnetic recording medium was formed. This perpendicular magnetic recording medium has the same structure as the perpendicular magnetic recording medium of Example 1, except for the auxiliary magnetic film.

In this comparative example, the auxiliary magnetic film was made of CoPt and had a film thickness of 1 nm. The product tBr was 750 µT·µm, the exchange stiffness constant $A_2$ was $5 \times 10^{-12}$ J/m, the coercive force $H_{c//2}$ was 126 kA/m, the coercive force $H_{c\perp 2}$ was 521 kA/m, the ratio $H_{c//2}/H_{c\perp 2}$ was 25%, and the magnetocrystalline anisotropy field $H_{k2}$ was 1600 kA/m.

COMPARATIVE EXAMPLE 2

As a second comparative example, a perpendicular magnetic recording medium having a laminated structure without the auxiliary magnetic film 44 of Example 1 was formed. The other layers were the same as those of Example 1.

For the above Examples and Comparative Examples, a computer simulation according to the micro-magnetics model was performed. In this simulation, recording was performed on each perpendicular magnetic recording medium with a single-pole magnetic head, so as to determine the residual magnetization. Here, the saturation magnetic flux density Bs of the recording magnetic pole of the single-pole magnetic head was 1.4 T. The magnetic spacing between the single magnetic pole and each perpendicular magnetic recording medium was 8 nm. The magnetic field of the head was 1600 kA/m (20 kOe), with the recording layer being the center. The recording density was 30.4 k(magnetization inversion)/mm (773 kFCI).

Figure 5A:
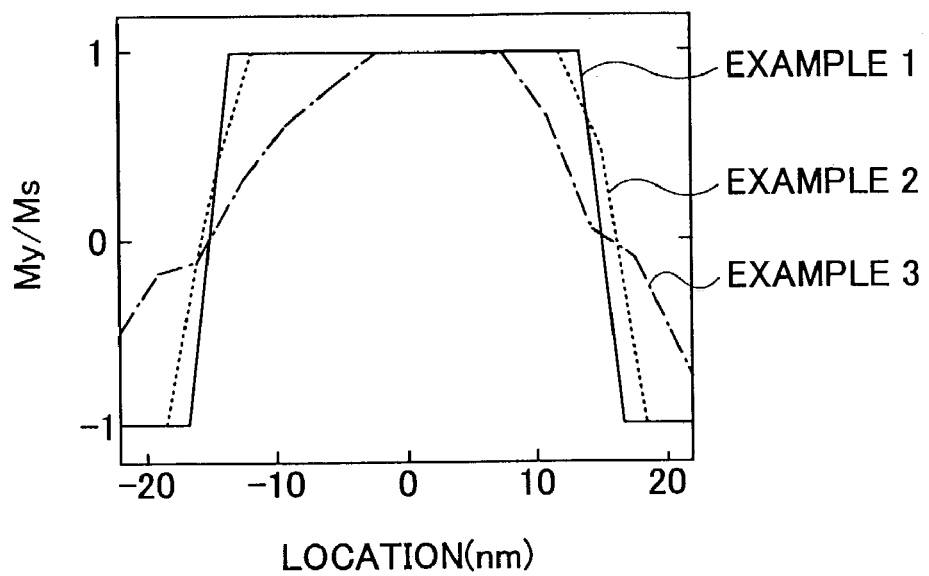
FIGS. 5A and 5B illustrate the residual magnetization states in the perpendicular recording medium immediately after a recording operation.
Figure 5B:
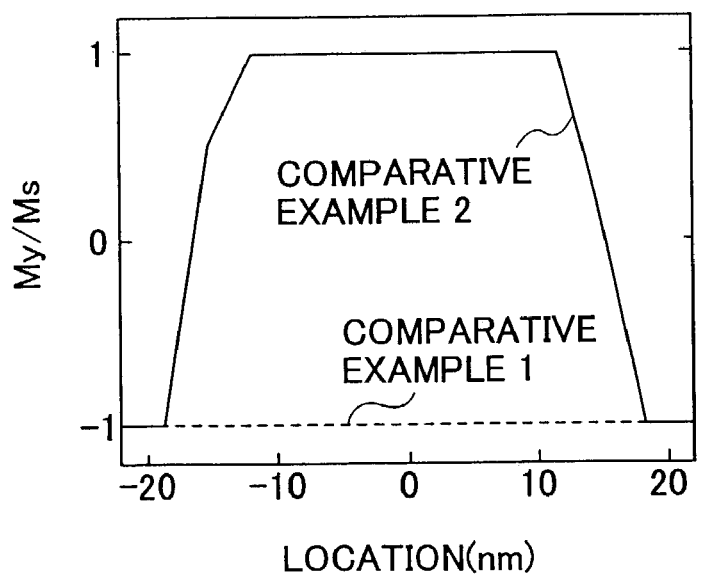

FIGS. 5A and 5B illustrate the residual magnetization states of the recording layer immediately after a recording operation on the perpendicular magnetic recording medium. FIG. 5A illustrates the residual magnetization states in Examples, and FIG. 5B illustrates the residual magnetization states in Comparative Examples. In FIGS. 5A and 5B, the abscissa axis indicates the location on the perpendicular magnetic recording medium in the track circumferential direction, and the ordinate axis indicates the magnetization My in the direction perpendicular to the film surface. The magnetization My is standardized by the saturation magnetization Ms. For instance, when the ratio My/Ms has a positive value, the surface of the perpendicular magnetic recording medium has positive magnetization. If the ratio My/Ms has a negative value, the surface of the perpendicular magnetic recording medium has negative magnetization.

As can be seen from FIG. 5A, in Examples 1 and 2, the regions in which the ratio My/Ms changes from −1 to 1 or 1 to −1 show dramatic changes. In other words, the magnetic transition regions are narrow, and thus high-density recording can be performed in Examples 1 and 2. In Example 3, the magnetic transition regions are a little wider than those in Examples 1 and 2. In view of high-density recording, Examples 1 and 2 are more preferable than Example 3.

As can be seen from FIG. 5B, Comparative Example 1 exhibits the same residual magnetization state as the magnetic state prior to the recording operation, though the recording operation has already been completed. The exchange stiffness constant $A_2$ of the auxiliary magnetic film is as large as 0.5, and the exchange interaction effect of the auxiliary magnetic film on the magnetic nanoparticles of the recording layer is great. Accordingly, the magnetization of the magnetic nanoparticles cannot be inverted by the recording magnetic field.

Comparative Example 2 exhibits narrow magnetic transition regions and the same residual magnetization state as that of Example 1 or 2. However, the magnetization in Comparative Example 2 decreases rapidly with time, as described later, and is poor in thermal stability. Because of this, it is apparent that the perpendicular magnetic recording medium of Comparative Example 2 is not suitable as a recording medium.

Figure 6:
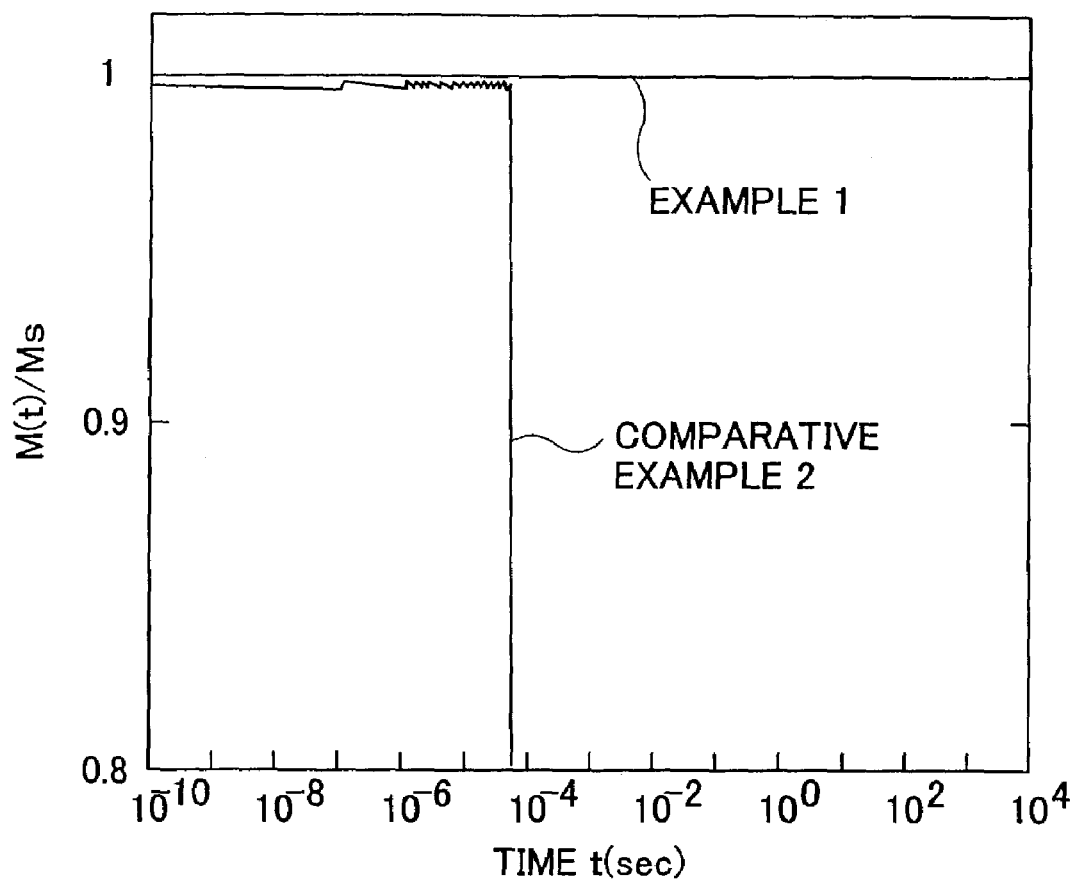
FIG. 6 illustrates a change in the recording magnetization with time.

FIG. 6 illustrates residual magnetization changes with time obtained through a computer simulation. In FIG. 6, the abscissa axis indicates time t after a recording operation, and the ordinate axis indicates the residual magnetization M(t) at the time t. Here, the residual magnetization M(t) is standardized by the magnetization immediately after the recording operation, i.e., the saturation magnetization Ms. In Comparative Example 2, the ratio M(t)/Ms rapidly decreases $10^{-5}$ or $10^{-4}$ seconds after the recording. On the other hand, in Example 1, the ratio M(t)/Ms does not decrease even $10^4$ seconds after the recording. This means that the thermal stability of the recording magnetization is excellent in Example 1. Although not shown in FIG. 6, Examples 2 and 3 showed the same results as Example 1.

FIG. 7 collectively shows the above results, including the parameters used in Examples and Comparative Examples and the results of the computer simulations. In each perpendicular magnetic recording medium of Examples 1 through 3, the exchange stiffness constant $A_2$ of the auxiliary magnetic film satisfies the condition $0.1 < A_2 < 0.5$, so that the residual magnetization state having narrow magnetic transition regions can be formed immediately after recording. At the same time, the auxiliary magnetic film has an exchange interaction effect on the magnetic nanoparticles of the recording layer, and thus secures the magnetization of the magnetic nanoparticles. In this manner, the thermal stability of the magnetization of the recording layer can be improved. Furthermore, the ratio of the coercive force $H_{c//2}$ of the longitudinal direction of the auxiliary magnetic film 44 to the coercive force $H_{c\perp 2}$ of the perpendicular direction of the auxiliary magnetic film is lowered, so that the magnetic transition regions formed by the magnetic nanoparticles can be narrowed. Thus, a perpendicular magnetic recording medium that is suitable for high-density recording can be obtained.

Figure 8:
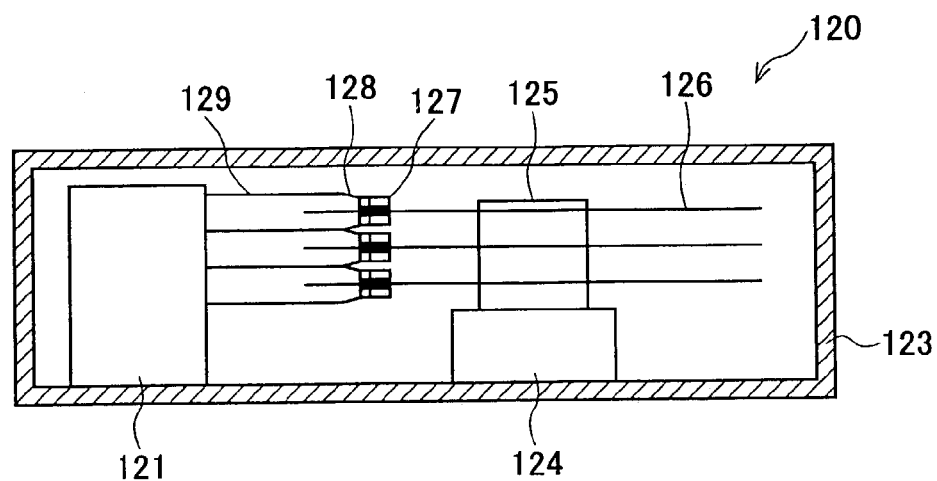
FIG. 8 is a sectional view of a magnetic recording device employing a perpendicular magnetic recording medium in accordance with the present invention.
Figure 9:
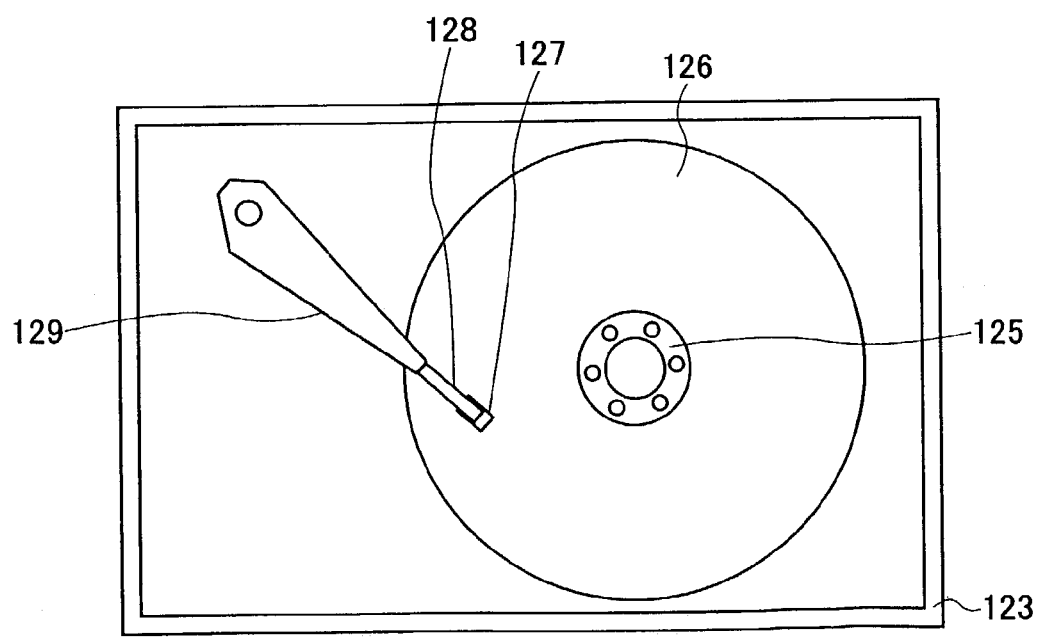
FIG. 9 is a plan view of the magnetic recording device of FIG. 8.

Referring now to FIGS. 8 and 9, an example of a magnetic recording device in accordance with the present invention will be described. FIG. 8 is a sectional view illustrating the components of a magnetic recording device 120. FIG. 9 is a plan view illustrating the components of the magnetic recording device 120.

As shown in FIGS. 8 and 9, the magnetic recording device 120 is housed in a housing 123. In the housing 123, the magnetic recording device 120 has a motor 124, a hub 125, a plurality of magnetic recording media 126, a plurality of recording and reproducing heads 127, a plurality of suspensions 128, a plurality of arms 129, and an actuator unit 121. The magnetic recording media 126 are attached to the hub 125 that is rotated by the motor 124. The recording and reproducing heads 127 are complex heads including thin-film recording heads and reproducing heads of MR devices, GMR (Giant Magnetoresistive) devices, or TMR (Tunneling Magnetoresistive) devices. The recording and reproducing heads 127 are respectively attached to the corresponding arms 129 with the corresponding suspensions 128. The arms 129 are driven by the actuator unit 121. The fundamental structure of this magnetic recording device 120 is well-known, and therefore detailed explanation of it is omitted in this specification.

The magnetic recording device 120 of this example is characterized by the magnetic recording media 126. Each of the magnetic recording media 126 may be any of the perpendicular magnetic recording media of Examples 1 through 3 each including the laminated structure of FIG. 4. The number of the magnetic recording media 126 is not limited to 3, but may be 1, 2, or larger than 3.

The structure of the magnetic recording device 120 is not limited to the structure shown in FIGS. 8 and 9. Also, the magnetic recording media 126 employed in the magnetic recording device 120 of the present invention are not limited to magnetic disks.

It should be noted that the present invention is not limited to the embodiments specifically disclosed above, but other variations and modifications may be made without departing from the scope of the present invention.

The present application is based on Japanese priority application No. 2002-165820 filed on Jun. 6, 2002, the entire contents of which are hereby incorporated by reference.

What is claimed is:

1. A perpendicular magnetic recording medium having a recording layer over a substrate, the medium comprising:
   the recording layer being a single layer formed by aligning magnetic nanoparticles of uniform particle sizes at uniform intervals throughout all of the recording layer; and
   an auxiliary magnetic film that is located between the recording layer and the substrate at such a position that the auxiliary magnetic film has an exchange interaction effect on the magnetic nanoparticles so as to improve thermal stability of the magnetic nanoparticles after the auxiliary magnetic film is magnetized,
   wherein a product tBr of a thickness and a residual magnetic flux density of the auxiliary magnetic film is less than a product tBr of the recording layer.

2. The perpendicular magnetic recording medium as claimed in claim 1, wherein the auxiliary magnetic film has an exchange stiffness constant in the range of $1 \times 10^{-12}$ J/m to $5 \times 10^{-12}$ J/m.

3. The perpendicular magnetic recording medium as claimed in claim 1, wherein the auxiliary magnetic film product tBr is equal to or smaller than 30% of the product tBr of the recording layer.

4. The perpendicular magnetic recording medium as claimed in claim 1, wherein the auxiliary magnetic film includes an alloy of at least two elements selected from the group consisting of Fe, Co, Pd, and Pt.

5. The perpendicular magnetic recording medium as claimed in claim 1, wherein the auxiliary magnetic film includes an artificial lattice film having a lamination of either Fe and a non-magnetic element, or Co and a non-magnetic element.

6. The perpendicular magnetic recording medium as claimed in claim 1, wherein the coercive force in the longitudinal direction of the recording layer is equal to or smaller than 5% of the coercive force in the direction perpendicular to the recording layer.

7. The perpendicular magnetic recording medium as claimed in claim 1, further comprising a soft-magnetic backing layer between the substrate and the auxiliary magnetic film.

8. The perpendicular magnetic recording medium as claimed in claim 1, further comprising a non-magnetic intermediate layer below the auxiliary magnetic film.

9. A magnetic recording device comprising a magnetic recording medium that includes:
   a recording layer being a single layer formed by aligning magnetic nanoparticles of uniform particle sizes at uniform intervals throughout all of the recording layer; and
   an auxiliary magnetic film that is located between the recording layer and a substrate at such a position that the auxiliary magnetic film has an exchange interaction effect on the magnetic nanoparticles so as to improve thermal stability of the magnetic nanoparticles after the auxiliary magnetic film is magnetized,
   wherein a product tBr of a thickness and a residual magnetic flux density of the auxiliary magnetic film is less than a product tBr of the recording layer.

10. The magnetic recording device as claimed in claim 9, wherein the auxiliary magnetic film has an exchange stiffness constant in the range of $1 \times 10^{-12}$ J/m to $5 \times 10^{-12}$ J/m.

11. The magnetic recording device as claimed in claim 9, wherein the auxiliary magnetic film product tBr is equal to or smaller than 30% of the product tBr of the recording layer.

12. The magnetic recording device as claimed in claim 9, wherein the auxiliary magnetic film includes an alloy of at least two elements selected from the group consisting of Fe, Co, Pd, and Pt.

13. The magnetic recording device as claimed in claim 9, wherein the auxiliary magnetic film includes an artificial lattice film having a lamination of either Fe and a non-magnetic element, or Co and a non-magnetic element.

14. The magnetic recording device as claimed in claim 9, wherein the coercive force in the longitudinal direction of the recording layer is equal to or smaller than 5% of the coercive force in the direction perpendicular to the recording layer.

15. The magnetic recording device as claimed in claim 9, further comprising a soft-magnetic backing layer between the substrate and the auxiliary magnetic film.

16. The magnetic recording device as claimed in claim 9, further comprising a non-magnetic intermediate layer below the auxiliary magnetic film.

* * * * *